United States Patent
Garcia-Luna-Aceves et al.

(10) Patent No.: US 7,002,949 B2
(45) Date of Patent: Feb. 21, 2006

(54) BANDWIDTH EFFICIENT SOURCE TRACING (BEST) ROUTING PROTOCOL FOR WIRELESS NETWORKS

(75) Inventors: Jose Joaquin Garcia-Luna-Aceves, San Mateo, CA (US); Jyoti Raju, Saratoga, CA (US)

(73) Assignee: The Regents of the University of California, Oakland, CA (US)

( * ) Notice: Subject to any disclaimer, the term of this patent is extended or adjusted under 35 U.S.C. 154(b) by 957 days.

(21) Appl. No.: 09/883,082

(22) Filed: Jun. 15, 2001

(65) Prior Publication Data

US 2002/0036987 A1 Mar. 28, 2002

Related U.S. Application Data

(60) Provisional application No. 60/212,436, filed on Jun. 16, 2000.

(51) Int. Cl.
*H04L 12/28* (2006.01)
(52) U.S. Cl. .................................. 370/351; 370/400
(58) Field of Classification Search ............. 370/338, 370/351, 352, 238, 400, 255, 600, 407, 389, 370/392, 229, 254
See application file for complete search history.

(56) References Cited

U.S. PATENT DOCUMENTS

| 5,964,841 | A | 10/1999 | Rekhter | |
|---|---|---|---|---|
| 6,304,556 | B1 * | 10/2001 | Haas | 370/254 |
| 6,535,498 | B1 * | 3/2003 | Larsson et al. | 370/338 |
| 6,704,283 | B1 * | 3/2004 | Stiller et al. | 370/238 |
| 6,798,765 | B1 * | 9/2004 | Larsson | 370/351 |
| 6,816,460 | B1 * | 11/2004 | Ahmed et al. | 370/238 |
| 6,836,463 | B1 * | 12/2004 | Garcia-Luna-Aceves | 370/238 |

OTHER PUBLICATIONS

Raju, J. et al., "A new approach to on-demand loop-free multipath routing", Eighth International Conference on Computer Communications and Networks, Boston, MA, Oct. 11-13, 1999, IEEE Proceedings, Oct. 11, 1999, pp. 522-527.

Garcia-Luna-Aceves, J.J., "A distributed loop-free, shortest-path routing algorithm", Networks: Evolution or Revolution? New Orleans, LA, Mar. 27-31, 1988, Proceedings of the Annual Joint Conference of the Computer and Communications Societies (Infocom), vol. 7, Mar. 27, 1988, pp. 1125-1137.

* cited by examiner

*Primary Examiner*—Hassan Kizou
*Assistant Examiner*—Ricardo Pizarro
(74) *Attorney, Agent, or Firm*—John P. O'Banion

(57) ABSTRACT

A bandwidth efficient routing protocol for wireless ad-hoc networks. This protocol can be used in ad-hoc networks because it considerably reduces control overhead, thus increasing available bandwidth and conserving power at mobile stations. It also gives very good results in terms of the throughput seen by the user. The protocol is a table-driven distance-vector routing protocol that uses the same constraints used in on-demand routing protocols, i.e., paths are used as long as they are valid and updates are only sent when a path becomes invalid. The paths used by neighbors are maintained and this allows the design of a distance-vector protocol with non-optimum routing and event-driven updates, resulting in reduced control overhead.

20 Claims, 5 Drawing Sheets

BANDWIDTH EFFICIENT SOURCE TRACING (BEST) ROUTING PROTOCOL FOR WIRELESS NETWORKS

CROSS-REFERENCE TO RELATED APPLICATIONS

This application claims priority from U.S. Provisional Application Ser. No. 60/212,436 filed on Jun. 16, 2000, which is incorporated herein by reference.

STATEMENT REGARDING FEDERALLY SPONSORED RESEARCH OR DEVELOPMENT

This invention was made with Government support under Grant No. F30602-97-2-0338, awarded by the Air Force Office of Scientific Research, Defense Advanced Research Projects Agency (DARPA). The Government has certain rights in this invention.

REFERENCE TO A MICROFICHE APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office file or records, but otherwise reserves all copyright rights whatsoever. the copyright owner does not hereby waive any of its rights to have this patent document maintained in secrecy, including without limitation its rights pursuant to 37 C.F.R.§1.14.

BACKGROUND OF THE INVENTION

1. Field of the Invention

This invention pertains generally to wireless networking, and more particularly to protocols for use in wireless ad-hoc networks.

2. Description of the Background Art

Ad-hoc networks, also known as multi-hop packet-radio networks, typically consist of mobile hosts that are interconnected by routers that can also move. This architecture is used when there is no wired infrastructure in place. Examples of such networks are networks set up in disaster or military scenarios, and networks set up at temporary events such as a class lecture or business convention. In most instances, not all stations are within line of sight of each other or a base station. Therefore, packets have to be relayed several times over multiple-access channels. Due to limited transmission range, mobility causes frequent changes in connectivity; that is, the network topology is dynamic. All the stations are identical and serve as both sources and relays of data traffic.

Due to the multihop and dynamic nature of ad-hoc networks, a distributed routing protocol is required to forward packets between mobile stations and to and from the Internet. Routers in an ad-hoc network can easily run routing protocols designed for wired networks, provided the routers contain proper stacks. However, wireless networks suffer from low bandwidth and high rates of interference. This implies that routing protocols should generate as few updates as possible, so as to use the least possible bandwidth for control traffic. Mobility also increases the bandwidth used for control packets. As links go up and down frequently, more updates need to be sent to maintain correct topology information. As congestion due to control overhead increases, the convergence time of the routing algorithm increases.

Considerable work has been done in the development of routing protocols for ad-hoc networks, starting in the 1970's with work on the DARPA PRNET and SURAN projects. In recent years, the interest in ad-hoc networks has grown due to the availability of wireless communication devices that work in the ISM bands in the U.S.

Routing for ad-hoc networks can be classified into two main types: (i) table-driven and (ii) on-demand. Table driven routing attempts to maintain consistent information about the path from each node to every other node in the network. For example, the Destination-Sequenced Distance-Vector Routing (DSDV) protocol is a table driven algorithm that modifies the Bellman-Ford routing algorithm to include timestamps that prevent loop-formation. The Wireless Routing Protocol (WRP) is a distance vector routing protocol which belongs to the class of path-finding algorithms that exchange second-to-last hop to destinations in addition to distances to destinations. This extra information helps remove the "counting-to-infinity" problem that most distance vector routing algorithms suffer from. It also speeds up route convergence when a link failure occurs.

On-demand routing protocols were designed with the aim of reducing control overhead, thus increasing bandwidth and conserving power at the mobile stations. These protocols limit the amount of bandwidth consumed by maintaining routes to only those destinations for which a source has data traffic. Therefore, the routing is source-initiated as opposed to table-driven routing protocols that are destination initiated. There are several recent examples of this approach, such as AODV, ABR, DSR, TORA, SSA, and ZRP, and the routing protocols differ with regard to the specific mechanisms used to disseminate flood-search packets and their responses, cache the information heard from other nodes' searches, determine the cost of a link, and determine the existence of a neighbor. However, all of the on-demand routing proposals use flood search messages that either: (a) give sources the entire paths to destinations, which are then used in source-routed data packets (e.g., DSR); or (b) provide only the distances and next hops to destinations, validating them with sequence numbers (e.g., AODV) or time stamps (e.g., TORA).

Several studies have been published comparing the performance of the above routing protocols using different simulators, mobility models and performance metrics. One of the first comprehensive studies was done by the Monarch project of CMU reported in J. Broch et al., "A Performance Comparison of Multi-Hop Wireless Ad Hoc Network Routing Protocols", Proc. ACM Mobicom 98, October 1998. This study compared DSDV, AODV, DSR and TORA and introduced some standard metrics that may be used in further studies of wireless routing protocols. A paper by S. R. Das et al., "Comparative Performance Evaluation of Routing Protocols for Mobile Ad-Hoc Networks", 7th Int. Conf. on Comp. Communication and Networks, pages 153–161, October 1998, compares a larger number of protocols. However, link level details and MAC interference are not modeled. This may not give an adequate reflection of the delays suffered by packets that are made to wait while the MAC protocol acquires the channel. It also does not reflect how high data traffic rate may interfere with routing protocol convergence. Another recent study by P. Johansson et al., "Scenario-based Performance Analysis of Routing Protocols for Mobile Ad-Hoc Networks", Proc. IEEE/ACM Mobicom '99, pp. 195–206, August 1999, compares the same protocols as in J. Broch et al. This study used specific scenarios to test the protocol behavior. Based on their results, all of these papers conclude that on-demand routing protocols perform better than table-driven routing protocols. However, all of the table-driven routing protocols tested use the optimum routing approach. In other words, these protocols try to maintain shortest paths at all times. A consequence of maintaining shortest paths is that if the topology of the network changes rapidly, the control overhead increases dramatically.

Therefore, there is a need for a bandwidth efficient and reliable routing protocol for ad-hoc networks. The present invention satisfies that need, as well as others, and overcomes deficiencies in current table-driven and on-demand protocols.

BRIEF SUMMARY OF THE INVENTION

The present invention comprises a bandwidth efficient routing protocol for wireless ad-hoc networks. This protocol can be used in ad-hoc networks because it considerably reduces control overhead, thus increasing available bandwidth and conserving power at mobile stations. It also gives very good results in terms of the throughput seen by the user.

We have found that relaxing the requirement for shortest paths in a table driven routing protocol can lead to solutions whose performance is equivalent or even better than the performance of on-demand routing approaches. Accordingly, the present invention comprises a table-driven distance-vector routing protocol that uses the same constraints used in on-demand routing protocols, i.e., paths are used as long as they are valid and updates are only sent when a path becomes invalid. To this end, the present invention adapts WRP to provide non-optimum routing, which we refer to as bandwidth efficient source tracing (BEST). The reason why prior table-driven routing protocols have been unable to perform non-optimum routing is that these protocols have used either distances to destinations or topology maps to predict paths to destinations. However, none of these techniques allow a router to discern if the path picked by it conflicts with its neighbors, resulting in "counting to infinity" problems. Consequently, these protocols have to send updates in order to avoid loops, and the best that can be done is that the updates are sent periodically. However, in BEST, the paths used by neighbors are maintained and this allows the design of a distance-vector protocol with non-optimum routing and event-driven updates, resulting in reduced control overhead.

By way of example, and not of limitation, a node i routes data packets according to the present invention by selecting a neighbor p as the next hop in a route from node i to destination j if the path from neighbor p to destination j does not include node i and does not repeat any node, and $D_{yp}^{i} < D_{yp}^{i}$ for any other neighbor x and for all nodes y that are in the path from destination j to neighbor p, where $D_{yp}^{i}$ is the distance value of the route from node i to node y through neighbor p and $D_{yp}^{i}$ is the distance value of the route from node i to node y through neighbor x. For the purpose of routing table updating, a node A considers a node B as its neighbor if it hears update messages from node B. Node B is no longer node A's neighbor when node A cannot send data packets to it.

An object of the invention is to reduce control overhead in ad-hoc networks.

Another object of the invention is to provide a bandwidth efficient routing protocol for ad-hoc networks.

Another object of the invention is to provide a table-driven routing protocol that meets or exceeds the performance of on-demand routing approaches.

Another object of the invention is to provide a table-driven routing protocol that is able to perform non-optimum routing.

Another object of the invention is reduce control overhead in table-driven routing protocols.

Another object of the invention is to provide a table-driven routing protocol that does not require reliable updates.

Another object of the invention is to reduce routing loops in a table-driven routing protocol by looking into the IP headers of data packets.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Figure 1:
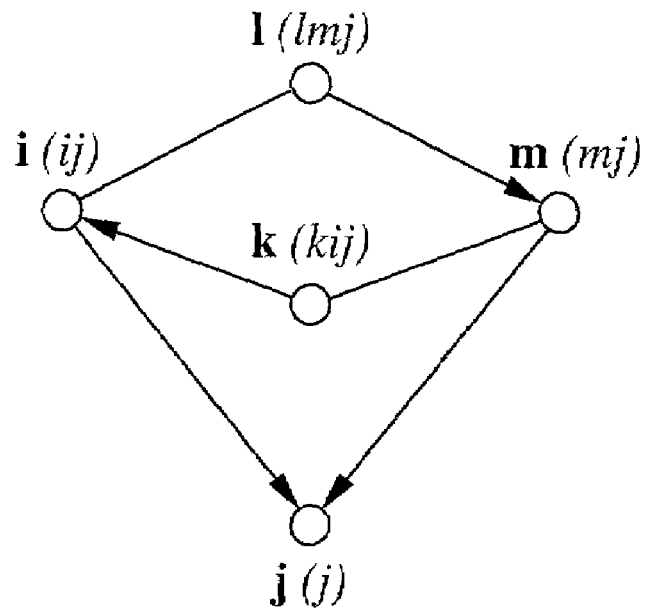
FIG. 1 is a routing diagram illustrating all nodes having loop-free routes.

The present invention comprises a routing protocol for ad-hoc wireless networks, which we also refer to herein as bandwidth efficient source tracing (BEST). The following description of the invention is for illustrative purposes, and those skilled in the art will appreciate from this description that the details presented herein may be modified without departing from the present invention.

A. Network Model

A network is modeled as an undirected graph G(V, E) which can have partitions. V is the number of nodes in the network and E is the number of links in the network. A node principally consists of a router, which may be physically attached to multiple IP hosts (or IP-addressable devices). Instead of having interface identifiers, a router has a single node identifier, which helps the routing and other application protocols identify the router. In a wireless network, a node has radio connectivity with multiple nodes using a single physical radio link.

Accordingly, we map a physical broadcast link connecting a node and its multiple neighbors into point-to-point links between the node and its neighbors. Each link has a positive cost associated with it. If a link fails, its cost is set to infinity. A node failure is modeled as all links incident on the node getting set to infinity.

For the purpose of routing table updating, a node A considers a node B as its neighbor if it hears update messages from node B. Node B is no longer node A's neighbor when node A cannot send data packets to it.

Routing messages are broadcast unreliably and the protocol assumes that routing packets may be lost due to changes in link connectivity, fading or jamming. A neighbor protocol is used that brings up a link when it hears sufficient number of packets from a neighbor. The link is brought down when a unicast data packet can no longer be sent to the neighbor despite retransmissions at the link layer. The functionality of such a neighbor protocol can be easily added onto a MAC protocol like (e.g., IEEE 802.11), TDMA, or any of the various dynamic scheduling MAC protocols proposed recently without requiring additional network-level control packets.

B. Routing Structures Maintained

The routing structures maintained in the present invention are (i) a routing table and (ii) a distance table. Since messages are assumed to be transmitted unreliably, no "message retransmission list" is required. BEST also does not maintain any packet buffer for data packets waiting for routes. Packets are sent if there is a valid route and they are dropped if there is no valid path at the moment of arrival.

The routing table at router i contains entries for all known destinations. Each entry comprises the destination identifier j, the successor to that destination $s^i_j$, the second-to-last-hop to the destination $p^i_j$, the distance to the destination $D^i_j$ and a route tag $tag^i_j$. When the element $tag^i_j$ is set to "correct", it implies a loop-free finite value route. When it is set to "null", it implies that the route still has to be checked. When it is set to "error", an infinite metric route or a route with a loop is implied.

The distance table at router i is a matrix containing, for each known neighbor k and each destination j, the distance value $D^i_{jk}$ of the route from i to j through k, and the second-to-last hop $P^i_{jk}$ on that route. $D^i_{jk}$ is always set equal to $RD^k_{jk}+l^i_k$, where $RD_{jkjk}$ is the distance reported by k to j in the last routing message and $l^i_k$ is the link cost of link (i, k). The link cost may be set to one reflecting hop count or it may be set to some other link parameter such as latency, bandwidth, etc.

C. Routing Information Exchanged

Routing update messages are broadcast to all neighbors. Each packet contains the address of the sender and a list of routing table entries, where each entry specifies a destination, the distance to the destination and the predecessor to the destination. If the MAC layer allowed for transmission of reliable updates with no retransmission overhead, only incremental routing updates need to be sent. In our work, however, we assume a MAC protocol based on collision avoidance. To avoid collisions of data packets with other packets caused by hidden terminals, such protocols require nodes to defer for fixed periods of time after detecting carrier. Accordingly, sending larger control packets does not decrease throughput at the MAC layer, because the overhead (RTS-CTS exchange) for the MAC protocol to acquire the channel does not depend on packet size. Therefore, in the rest of the description, we assume that routers transmit their entire routing tables when they send control messages. Control packet size may affect the delay experienced by packets in the MAC layer. However, as our simulations show, this does not affect data packet delays because the number of control packets we generate is substantially low.

All data packets contain the source and the destination and are unicast reliably by the link layer.

D. Routing Table Updating

Routing tables are updated under two conditions, the first condition being the receipt of an update message and the second condition being a detection of a link status change.

1. Receiving an Update

When an update from neighbor k is received, the entries in the distance table corresponding to neighbor k are updated. The paths to each destination are then recomputed by considering the path offered by each neighbor and traversing the path using the predecessor information. A node i running BEST picks a neighbor p as next hop for destination j if the following conditions are met:

(a) The path from p to j does not include i and does not repeat any node.

(b) $D^i_{yp}<D^i_{yx}$ for any other neighbor x and for all nodes y that are in the path from j to p (both inclusive).

After updating the routing table, BEST sends updates only if any of the following conditions have been met:

(1) A node discovers a new destination with a finite and valid path to the destination;

(2) A node loses the last path to a destination; or (3) A node suffers a distance increase to a destination.

From the above conditions, it follows that an update is not sent if a next hop to destination changes. It is also not sent if the distance to a destination decreases. However, an update is sent when the distance to a destination increases, because this condition has the potential to cause a loop.

Two more conditions are added to prevent permanent looping due to unreliable broadcasts as follows:

(4) A node sends a unicast update to a neighbor that sends it a data is packet, if the neighbor is upstream from it towards the destination.

(5) A node sends a unicast update to a neighbor that sends it a data packet, when the path implied by the neighbor's distance table entry is different from the path implied by the node's routing table.

Figure 2:
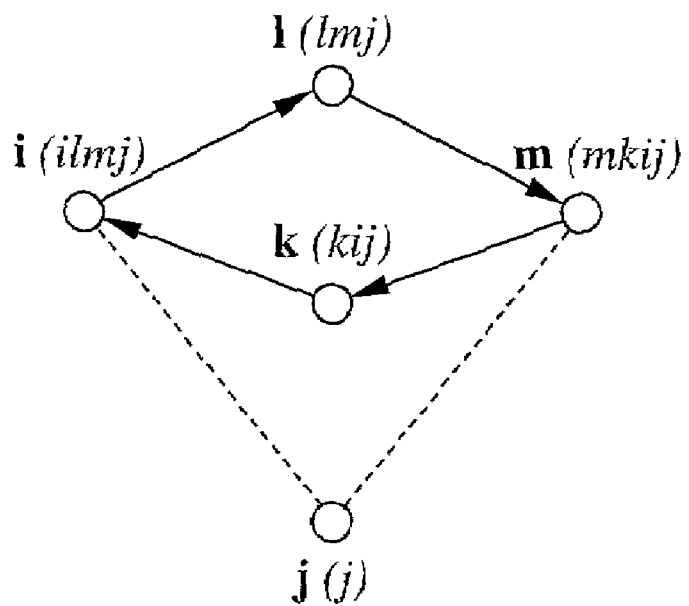
FIG. 2 is a routing diagram corresponding to FIG. 1 and illustrating that loss of links (i, j) and (m, j) and the loss of update packets from i and m can result in a loop.

In both of these conditions, the data packets are dropped. Permanent looping can occur when nodes are not aware of the latest changes in their neighbor's routing tables. The use of conditions (4) and (5) can be explained with the help of an example shown in FIG. 1. The node addresses are marked in bold font. Node j is the required destination. The path to j implied by traversing predecessors from j is marked in italics. Initially, all nodes have loop-free routes. The loss of links (i, j) and (m, j) and the loss of update packets from i and m can result in a loop shown in FIG. 2. When i gets a data packet from k, it finds that its distance table entry for k implies the path ij, while is own path implies ilmj which is different from ij. Therefore due to condition (5), the data packet is dropped and a unicast routing update is sent resulting in k setting its path to kmj. Now, when k gets a data packet from m, it sends a unicast update to m because m is its successor on the path to j. This follows from condition (4). When m gets the update, it detects a loop and resets its distance to infinity, thus breaking the loop.

2. Topology/Link-Cost Changes

When a MAC protocol can no longer send a data packet to a neighbor, the link to the neighbor is marked with value infinity, and all the distances are recomputed. If the path to any destination is lost, then an update is sent.

When the routing protocol gets a link up signal from the neighbor protocol, it broadcasts an update and includes the neighbor k in the distance table with all distances through k set to infinity. One exception is the distance of k through k, which is set to zero.

EXAMPLE 1

Performance Evaluation

We ran a number of simulation experiments to compare the performance of BEST against DSR. We chose DSR, because DSR has been shown to outperform other on-demand routing algorithms in previous studies. These simulations allowed us to independently change input parameters and check the protocol's sensitivity to these parameters. Both the protocols are implemented in CPT, which is a C++ based toolkit that provides a wireless protocol stack and extensive features for accurately simulating the physical aspects of a wireless multi-hop network. The protocol stack in the simulator can be transferred with a minimal amount of changes to a real embedded wireless router. The stack uses IP as the network protocol. The routing protocols directly use UDP to transfer packets. The link layer implements a medium access protocol very similar to the IEEE 802.11 standard and the physical layer is based on a direct sequence spread spectrum radio with a link bandwidth of 1 Mbit/sec.

To run DSR in CPT, we ported the DSR code available in the ns2 wireless release. There are two differences in our DSR implementation as compared to the implementation used in J. Broch et al. First, we did not use the "promiscuous" listening mode in DSR. Besides introducing security problems, this feature cannot be supported in any IP stack where the routing protocol is in the application layer and the MAC protocol uses multiple channels to transmit data. Second, the routing protocol in our stack did not have access to the MAC and link queues, which is the reason why we cannot reschedule packets that have already been scheduled over a link for DSR. Table 1 shows the constants used in the implementation of DSR.

TABLE 1

Constants Used in DSR Simulation

| Time between ROUTE REQUESTS (exponentially backed off) | 500 ms |
| Size of source route header carrying n addresses | 4n + 4 bytes |

TABLE 1-continued

Constants Used in DSR Simulation

| Timeout for Ring 0 search | 30 ms |
| Time to hold packets awaiting routes | 30 seconds |
| Max. number of pending packets | 50 |

EXAMPLE 2

Scenarios used in Comparison

We compared the protocols using two traffic scenarios. In both scenarios, we used the "random way-point" model described in J. Broch et al. In this model, each node begins the simulation by remaining stationary for "pause time" seconds and then selecting a random destination and moving to that destination at a speed of 20 m/s for a period of time uniformly distributed between 5 seconds and 11 seconds. Upon reaching the destination, the node pauses again for "pause time" seconds, selects another destination, and proceeds there as previously described, repeating this behavior for the duration of the simulation. We used the speed of 20 m/s, which is approximately the speed of a vehicle, because it has been used in simulations in earlier comparison papers by J. Broch et al. and by P. Johansson et al., and thus provides a basis for comparison with other protocols. Two nodes can hear each other if the attenuation value of the link between them is such that packets can be exchanged with a probability p, where p>0. The attenuation value between two nodes 1 and 2 is calculated using the following equation, $$156+40\log(d)-15\log(h1)-15\log(h2)-g1-g2 \qquad (1)$$

where d is the distance in miles, h1 is the height of antenna 1 in feet and h2 is the height of antenna 2 in feet (both set to 20 feet), and g1 is the gain of antenna 1 and g2 is the gain of antenna 2 (both set to 3). Thus, at a distance of 1 mile, the attenuation is 111 db. Attenuation values are recalculated every time a node moves.

In both scenarios, we used a 20 node ad-hoc network, moving over a flat space of dimensions 4.2×3.1 miles (6.6×4.8 km) and initially randomly distributed with a density of approximately one node per square mile. We have random data flows, where each flow is a peer-to-peer constant bit rate (CBR) flow with an interarrival time of 250 msecs between data packets. The data packet size is kept constant at 64 bytes. Data flows were started at times uniformly distributed between 20 seconds and 120 seconds and they go on until the end of the simulation. The pause times are varied: 0,30, 60, 120,300, 600 and 900 seconds as done in J. Broch et al.

In the first scenario, there are eight CBR sources, each of which establishes a connection with a randomly picked destination. All of the destinations are different from each other. Thus, we do not give an advantage to BEST over DSR, which unicasts replies. Three sets of simulations are run, each of which has a randomly generated source-destination pairs. The results are averaged over the three sets.

In the second scenario, we use 16 CBR sources. Since we model interference, our intention here is to see how the protocols perform as the cross traffic increases. Given that the overhead of table-driven routing protocols is independent of traffic, this scenario will also reflect on the scalability of the on-demand protocols. The results are averaged over three different runs of the simulation, each of which has randomly generated source-destination pairs. However, as described for the previous scenario, each destination is distinct.

In comparing the two protocols, we use the following metrics:

Packet Delivery Ratio: The ratio between the number of packets sent out by the sender application and the number of packets received by the corresponding peer application.

Control Packet Overhead: The total number of routing packets sent out during the simulation. Each broadcast packet is counted as a single packet.

Hop Count: The number of hops a data packet took from the sender to the receiver.

End to End Delay: The delay a packet suffers from leaving the sender application to arriving at the receiver application. Since dropped packets are not considered, this metric should be taken in context with the metric of packet delivery ratio.

The packet delivery ratio metric gives us an idea about the effect of routing policy on the throughput that a network can support. It also is a reflection of the correctness of a protocol.

The control packet overhead metric has an effect on the congestion seen in the network and also helps evaluate the efficiency of a protocol. Low control packet overhead is desirable in low-bandwidth environments and environments where battery power is an issue.

In ad-hoc networks, it is sometimes desirable to reduce the transmitting power to prevent collisions. This will result in packets taking more number of hops to reach destinations. However, if the power is kept constant, the distribution of the number of hops data packets travel through is a good measure of routing protocol efficiency.

Average end-to-end delay is not an adequate reflection of the delays suffered by data packets. A few data packets with high delays may skew results. Therefore, we plot the cumulative distribution function of the delays. This plot gives us a clear understanding of the delays suffered by the bulk of the data packets. Delay also has an effect on the throughput seen by reliable transport protocols like TCP.

EXAMPLE 3

Simulation Results

1. Scenario 1: 8 Sources

Figure 3:
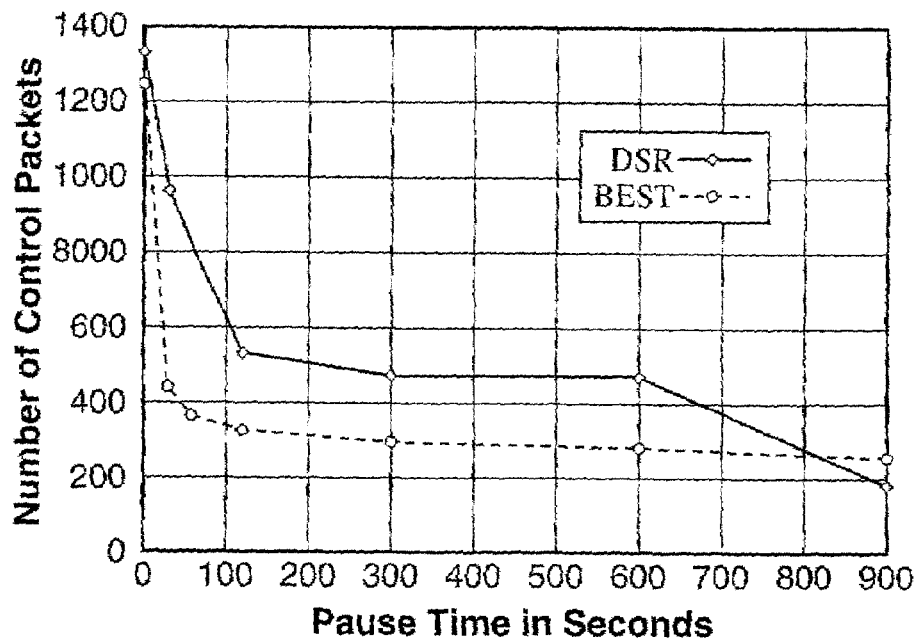
FIG. 3 is a graph comparing control overhead as a function of pause time for DSR to the same relationship for the present invention for an 8 source scenario.

FIG. 3 depicts the results for control packet overhead. The behavior of the protocols is very similar with BEST performing relatively better at higher rates of movement and plateauing off at lower speeds, while DSR performs better only for the case of no movement (pause time 900).

Figure 4:
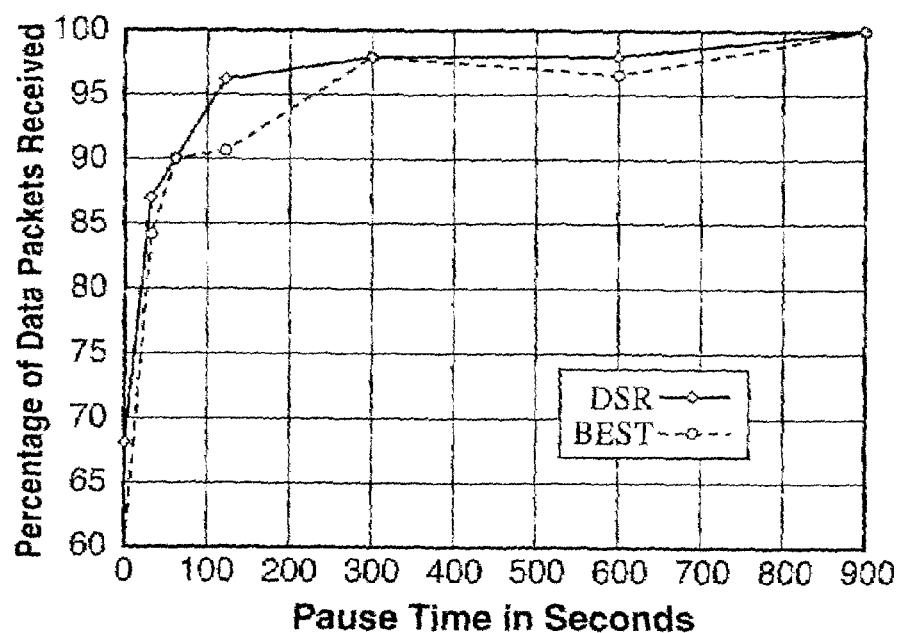
FIG. 4 is a graph comparing packet receipt as a function of pause time for DSR 20 to the same relationship for the present invention for an 8 source scenario.

In FIG. 4, we see that the percentage of data packets received are comparable for all both protocols, with DSR having a 2% edge over BEST.

Figure 5:
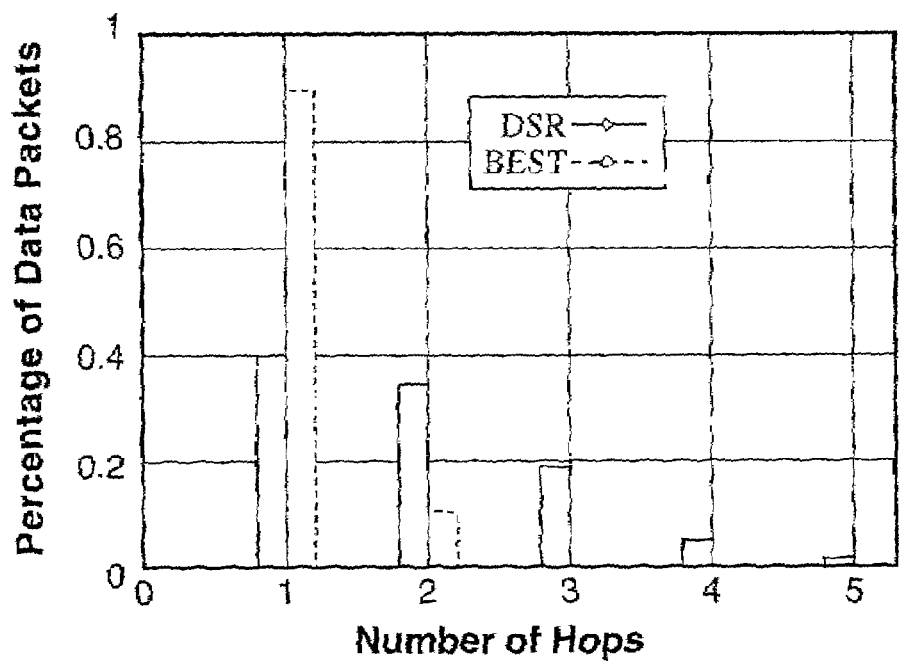
FIG. 5 is a graph comparing the distribution of hops for DSR to the same relationship for the present invention for an 8 source scenario.

For the next two graphs. the results are shown only for the highest mobility rate (pause time 0). FIG. 5 shows the results of the distribution of hops taken by the data packets. This graph depicts the noticeable difference between the routes taken by packets in an on-demand vs a table-driven protocol. Since BEST reacts to new links coming up, we notice that most packets take optimum paths. In fact, 50% of the packets take more optimal routes with BEST.

Figure 6:
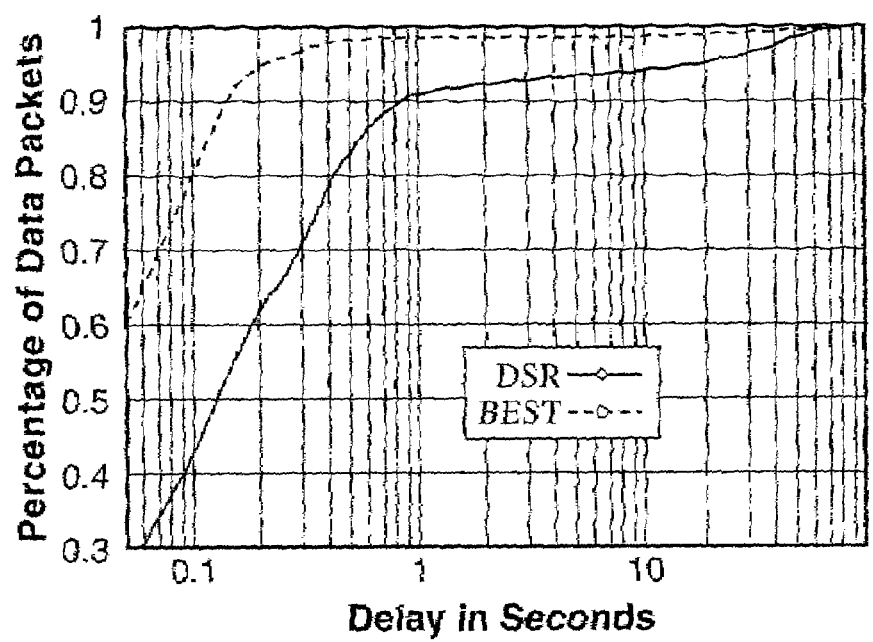
FIG. 6 is a graph comparing packet delay for DSR to the same relationship for the present invention for an 8 source scenario.

The most dramatic differences are seen in the delay performance shown in FIG. 6, which shows the delay in seconds on a logarithmic X axis. BEST has much better delay performance than DSR. Besides taking longer paths, packets also get delayed because they wait in buffers while routes are being searched for.

2. Scenario 2: 16 Sources

This scenario of 16 sources was simulated with the purpose of evaluating the behavior of the protocols as the number of traffic sources increases. We typically expect an on-demand protocol to suffer as the number of traffic sources increase. As stated earlier, the graphs are averages over three runs to prevent topology specific skewing of results.

Figure 7:
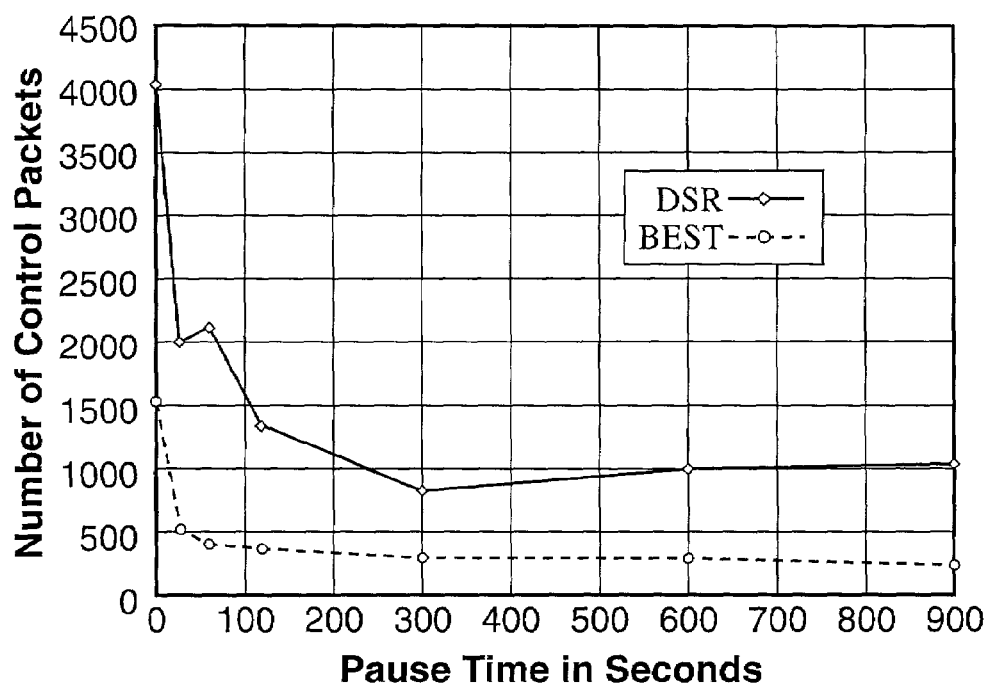
FIG. 7 is a graph comparing control overhead as a function of pause time for DSR to the same relationship for the present invention for a 16 source scenario.

FIG. 7 shows the results for control packet overhead. We see that DSR has an order of magnitude higher control overhead than BEST. As expected, the control overhead of BEST does not increase substantially due to increase in traffic.

Figure 8:
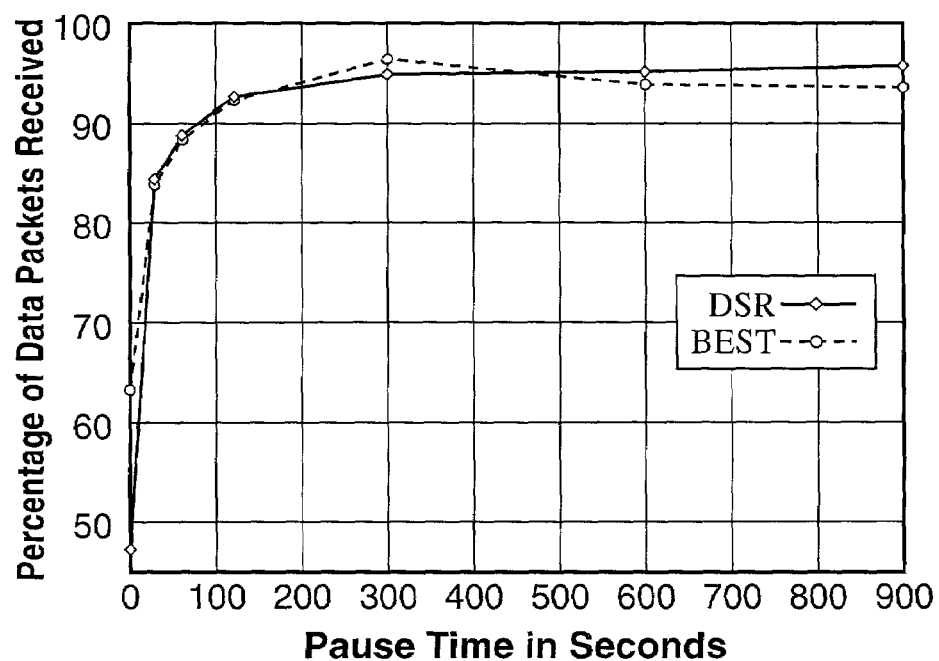
FIG. 8 is a graph comparing packet receipt as a function of pause time for DSR to the same relationship for the present invention for a 16 source scenario.

FIG. 8 depicts the results for the percentage of packets received. The performance of DSR suffer at pause time 0, with only 47% of the packets getting through to destinations, while BEST propagates 60% of the packets. For other pause times, the performance is very similar.

Figure 9:
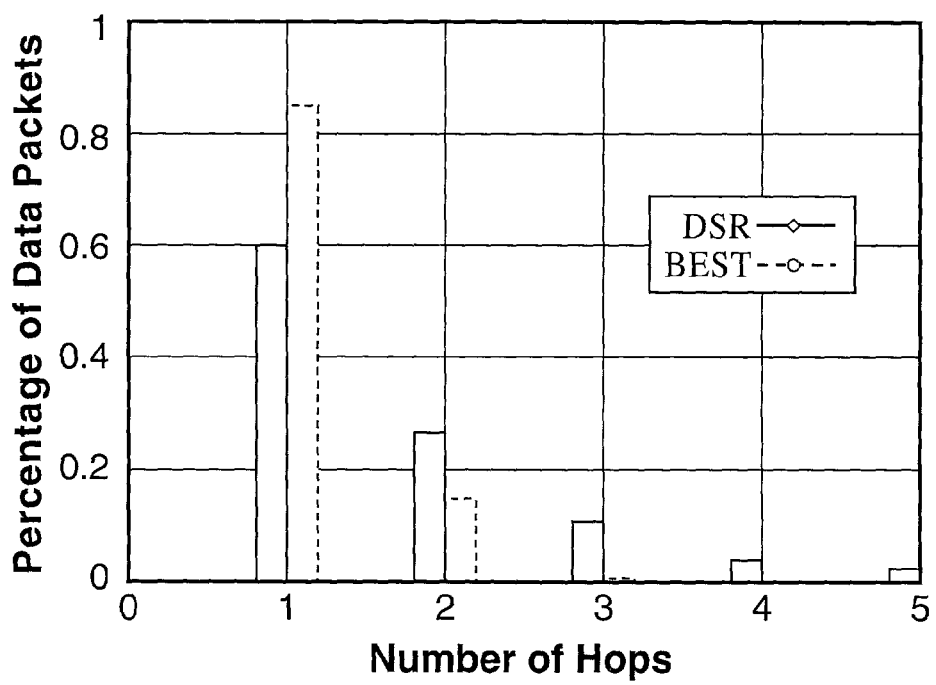
FIG. 9 is a graph comparing the distribution of hops for DSR to the same relationship for the present invention for a 16 source scenario.
Figure 10:
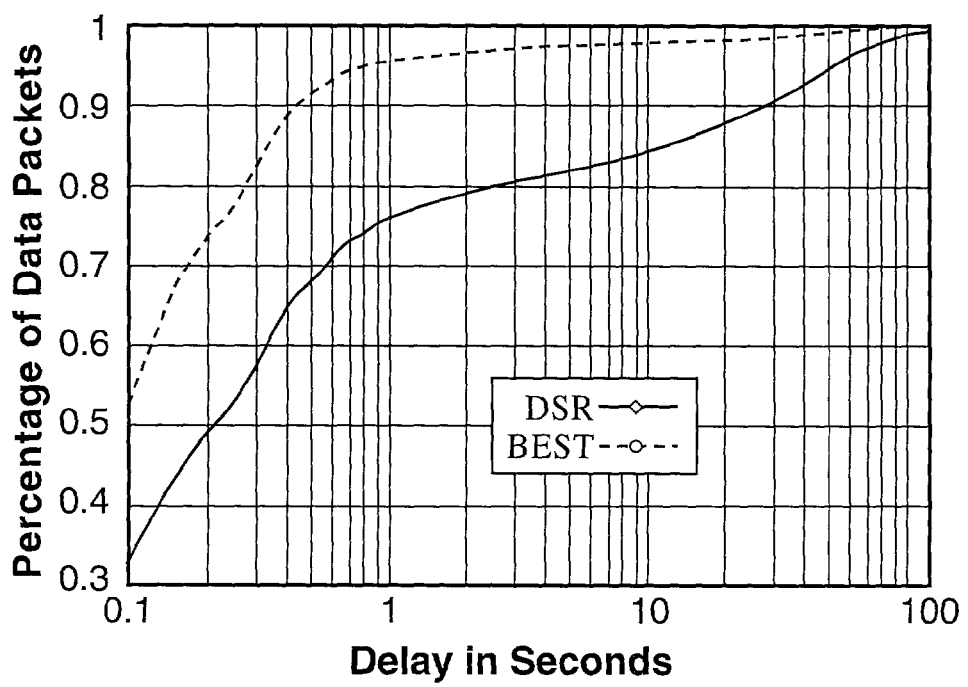
FIG. 10 is a graph comparing packet delay for DSR to the same relationship for the present invention for a 16 source scenario.

FIG. 9 and FIG. 10 both show results for the pause time 0. In FIG. 9, we see the hop distribution for the protocols, with BEST picking the most optimal paths. The delay distribution in FIG. 10 shows similar results. Around 95% of the data packets are delivered within one second by BEST, while DSR delivers only 70% of the data packets within one second.

From the foregoing, it will be appreciated that this invention can be used as the basis for wireless routers. Wireless routers employing BEST will eliminate the need for base station infrastructure and will allow looser configurations, thus removing the requirement for expensive land surveying. BEST can be written as an application process in regular TCP/IP stack, which means there will be minimal changes to the stack. It just requires information about links going up and down which most existing wireless MACs provide. One can foresee this invention being used in community networks and emergency networks. This will be especially useful in developing countries where there is no wired infrastructure in place. One of the most important advantages is that it will allow mobility.

A general observation that can be made is that, in wireless networks, protocol performance is linked very closely to the type of MAC protocol used. For instance, in DSR if the MAC protocol sends packets in bursts, we observe a lot more route error packets being sent in response to bursts of packet traveling on invalid paths. Therefore, BEST can be tailored to perform optimally for a given MAC protocol. As an example, we can reduce the size of the updates if the MAC protocol allows for reliable updates without any extra overhead.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explic-

What is claimed is:

1. A method for routing data packets in a wireless network at a node i, comprising:
   selecting a neighbor p as a next hop in a route from node i to destination j if
   (i) the path from neighbor p to destination j does not include node i and does not repeat any node, and
   (ii) $D_{yp}^{i} < D_{yx}^{i}$ for any other neighbor x and for all nodes y that are in the path from destination j to neighbor p,
   where $D_{yp}^{i}$ is the distance value of the route from node i to node y through neighbor p and $D_{yp}^{i}$ is the distance value of the route from node i to node y through neighbor x.

2. A method as recited in claim 1,
   wherein a first node considers a second as its neighbor if it hears update messages from said second node; and
   wherein said first node no longer considers said second node as its neighbor if said first node cannot send data packets to said second node.

3. A method as recited in claim 1, further comprising:
   sending updates to a routing table if
   a node discovers a new destination with a finite and valid path to the destination, or
   a node loses the last path to a destination, or
   a node suffers a distance increase to a destination.

4. A method as recited in claim 1, further comprising:
   sending a unicast routing table update from a node to a neighbor that sends it a data packet, if the neighbor is upstream from it towards the destination; and
   sending a unicast routing table update from a node to a neighbor that sends it a data packet when the path implied by the neighbor's distance table entry is different from the path implied by the node's routing table.

5. A method for routing data packets in a wireless network at a node i, comprising:
   (a) selecting a neighbor p as a next hop in a route from node i to destination j if
   (i) the path from neighbor p to destination j does not include node i and does not repeat any node, and
   (ii) $D_{yp}^{i} < D_{yx}^{i}$ for any other neighbor x and for all nodes y that are in the path from destination j to neighbor p,
   where $D_{yp}^{i}$ is the distance value of the route from node i to node y through neighbor p and $D_{yx}^{i}$ is the distance value of the route from node i to node y through neighbor x;
   (b) wherein a first node considers a second as its neighbor if it hears update messages from said second node; and
   (c) wherein said first node no longer considers said second node as its neighbor if said first node cannot send data packets to said second node.

6. A method as recited in claim 5, further comprising sending updates to a routing table if
   a node discovers a new destination with a finite and valid path to the destination, or
   a node loses the last path to a destination, or
   a node suffers a distance increase to a destination.

7. A method as recited in claim 5, further comprising:
   sending a unicast muting table update from a node to a neighbor that sends it a data packet, if the neighbor is upstream from it towards the destination; and
   sending a unicast routing table update from a node to a neighbor that sends it a data packet when the path implied by the neighboes distance table entry is different from the path implied by the node's routing table.

8. A method for routing data packets in a wireless network at a node i, comprising:
   (a) selecting a neighbor p as a next hop in a route from node i to destination j if
   (i) the path from neighbor p to destination j does not include node i and does not repeat any node, and
   (ii) $D_{yp}^{i} < D_{yx}^{i}$ for any other neighbor x and for all nodes y that are in the path from destination j to neighbor p,
   where $D_{yp}$, is the distance value of the route from node i to node y through neighbor p and $D_{yx}^{i}$ is the distance value of the route from node i to node y through neighbor x; and
   (b) sending updates to a routing table if
   (i) a node discovers a new destination with a finite and valid path to the destination, or
   (ii) a node loses the last path to a destination, or
   (iii) a node suffers a distance increase to a destination.

9. A method as recited in claim 8,
   wherein a first node considers a second as its neighbor if it hears update messages from said second node; and
   wherein said first node no longer considers said second node as its neighbor if said first node cannot send data packets to said second node.

10. A method as recited in claim 8, further comprising:
    sending a unicast routing table update from a node to a neighbor that sends it a data packet, if the neighbor is upstream from it towards the destination; and
    sending a unicast routing table update from a node to a neighbor that sends it a data packet when the path implied by the neighbors distance table entry is different from the path implied by the node's routing table.

11. A method for routing data packets in a wireless network at a node i, comprising:
    (a) selecting a neighbor p as a next hop in a route from node i to destination j if
    (i) the path from neighbor p to destination j does not include node i and does not repeat any node, and
    (ii) $D_{yp}^{i} < D_{yx}^{i}$ for any other neighbor x end for all nodes y that are in the path from destination j to neighbor p.
    where $D_{yp}^{i}$ is the distance value of the route from node i to node y through neighbor p and $D_{yx}^{i}$ is the distance value of the route from node i to node y through neighbor x;
    (b) sending a unicast routing table update from a node to a neighbor that sends it a data packet, if the neighbor is upstream from it towards the destination, and
    (c) sending a unicast routing table update from a node to a neighbor that sends it a data packet when the path implied by the neighbors distance table entry is different from the path implied by the node's routing table.

12. A method as recited in claim 11,
    wherein a first node considers a second as its neighbor if it hears update messages from said second node; and
    wherein said first node no longer considers said second node as its neighbor if said first node cannot send data packets to said second node.

13. A method as recited in claim 11, further comprising sending updates to a routing table if
    a node discovers a new destination with a finite and valid path to the destination, or
    a node loses the last path to a destination, or
    a node suffers a distance increase to a destination.

14. A method for muting data packets in a wireless network at a node i, comprising:
  (a) selecting a neighbor p as a next hop in a route from node i to destination j if
    (i) the path from neighbor p to destination j does not include node i and does not repeat any node, and
    (ii) $D_{yp}^{i} < D_{yx}^{i}$ for any other neighbor x and for all nodes y that are in the path from destination j to neighbor p,
    where $D_{yp}^{i}$ is the distance value of the route from node i to node y through neighbor p and $D_{yx}^{i}$ is the distance value of the route from node i to node y through neighbor x; and
  (b) sending updates to a routing table if
    (i) a node discovers a new destination with a finite and valid path to the destination, or
    (ii) a node loses the last path to a destination, or
    (iii) a node suffers a distance increase to a destination;
  (c) wherein a first node considers a second as its neighbor if it hears update messages from said second node; and
  (d) wherein said first node no longer considers said second node as its neighbor if said first node cannot send data packets to said second node.

15. A method as recited in claim 14, further comprising:
  sending a unicast routing table update from a node to a neighbor that sends it a data packet, if the neighbor is upstream from it towards the destination; and
  sending a unicast routing table update from a node to a neighbor that sends it a data packet when the path implied by the neighbor's distance table entry is different from the path implied by the node's routing table.

16. A method for routing data packets in a wireless network at a node i, comprising:
  (a) selecting a neighbor p as a next hop in a route from node i to destination j if
    (i) the path from neighbor p to destination i does not include node i and does not repeat any node, and
    (ii) $D_{yp}^{i} < D_{yx}^{i}$ for any other neighbor x and for all nodes y that are in the path from destination i to neighbor p.
    where $D_{yp}^{i}$ is the distance value of the route from node i to node y through neighbor p and $D_{yx}^{i}$ is the distance value of the route from node i to node y through neighbor x;
  (b) sending a unicast routing table update from a node to a neighbor that sends it a data packet, if the neighbor is upstream from it towards the destination; and
  (c) sending a unicast routing table update from a node to a neighbor that sends it a data packet when the path implied by the neighbor's distance table entry is different from the path implied by the node's muting table;
  (d) wherein a first node considers a second as its neighbor if it hears update messages from said second node; and
  (e) wherein said first node no longer considers said second node as its neighbor if said first node cannot send data packets to said second node.

17. A method as recited in claim 16, further comprising sending updates to a routing table if
  a node discovers a new destination with a finite and valid path to the destination, or
  a node loses the last path to a destination, or
  a node suffers a distance increase to a destination.

18. A method for routing data packets in a wireless network at a node i, comprising:
  (a) selecting a neighbor p as a next hop in a route from node i to destination j if
    (i) the path from neighbor p to destinationj does not include node i and does not repeat any node, and
    (ii) $D_{yp}^{i} < D_{yx}^{i}$ for any other neighbor x and for all nodes y that are in the path from destination j to neighbor p,
    where $D_{yp}^{i}$ is the distance value of the route from node i to node y through neighbor p and $D_{yx}^{i}$ is the distance value of the route from node i to node y through neighbor x;
  (b) sending updates to a routing table if
    (i) a node discovers a new destination with a finite and valid path to the destination, or
    (ii) a node loses the last path to a destination, or
    (iii) a node suffers a distance increase to a destination;
  (c) sending a unicast routing table update from a node to a neighbor that sends it a data packet, if the neighbor is upstream from it towards the destination; and
  (d) sending a unicast routing table update from a node to a neighbor that sends it a data packet when the path implied by the neighbors distance table entry is different from the path implied by the node's routing table.

19. A method as recited in claim 18,
  wherein a first node considers a second as its neighbor if it hears update messages from said second node; and
  wherein said first node no longer considers said second node as its neighbor if said first node cannot send data packets to said second node.

20. A method for routing data packets in a wireless network at a node i, comprising:
  (a) selecting a neighbor p as a next hop in a route from node i to destination j if
    (i) the path from neighbor p to destination j does not include node i and does not repeat any node, and
    (ii) $D_{yp}^{i<D}{}_{yx}^{i}$ for any other neighbor x and for all nodes y that are in the path from destination i to neighbor p,
    where $D_{yp}^{i}$ is the distance value of the route from node i to node y through neighbor p and $D_{yx}^{i}$ is the distance value of the route from node i to node y through neighbor x;
  (b) sending updates to a routing table if
    (i) a node discovers a new destination with a finite and valid path to the destination, or
    (ii) a node loses the last path to a destination, or
    (iii) a node suffers a distance increase to a destination.
  (c) sending a unicast routing table update from a node to a neighbor that sends it a data packet, if the neighbor is upstream from it towards the destination; and
  (d) sending a unicast muting table update from a node to a neighbor that sends it a data packet when the path implied by the neighbor's distance table entry is different from the path implied by the node's routing table;
  (e) wherein a first node considers a second as its neighbor if it hears update messages from said second node; and
  (f) wherein said first node no longer considers said second node as its neighbor if said first node cannot send data packets to said second node.

* * * * *